(12) United States Patent
Fridman et al.

(10) Patent No.: US 7,455,173 B1
(45) Date of Patent: Nov. 25, 2008

(54) PORTABLE TELESCOPING STACKING CONVEYOR

(75) Inventors: Boris Fridman, York, PA (US); J. Donald Brock, Chattanooga, TN (US)

(73) Assignee: Astec Industries, Inc., Chattanooga, TN (US)

(*) Notice: Subject to any disclaimer, the term of this patent is extended or adjusted under 35 U.S.C. 154(b) by 196 days.

(21) Appl. No.: 11/646,775

(22) Filed: Dec. 28, 2006

(51) Int. Cl.
*B65G 15/60* (2006.01)
*B65G 21/14* (2006.01)

(52) U.S. Cl. .................... 198/812; 198/302; 198/313

(58) Field of Classification Search ............... 198/302, 198/313, 632, 812
See application file for complete search history.

(56) References Cited

U.S. PATENT DOCUMENTS

| | | | |
|---|---|---|---|
| 2,263,506 A * | 11/1941 | Lane | 198/812 |
| 3,378,125 A * | 4/1968 | Fogg | 193/35 TE |
| 4,135,614 A | 1/1979 | Penterman et al. | |
| 4,474,287 A | 10/1984 | Thompson | |
| 4,643,299 A | 2/1987 | Calundan | |
| 5,096,048 A | 3/1992 | Lachner et al. | |
| 5,203,442 A | 4/1993 | Oury et al. | |
| 5,351,809 A | 10/1994 | Gilmore et al. | |
| 5,498,119 A | 3/1996 | Faivre | |
| 5,515,961 A | 5/1996 | Murphy et al. | |
| 5,669,562 A | 9/1997 | Smith | |
| 5,796,052 A | 8/1998 | Christmann | |
| 5,833,043 A | 11/1998 | Schmidgall et al. | |
| 6,056,252 A | 5/2000 | Johannsen | |
| 6,059,320 A | 5/2000 | Lycan | |
| 6,186,311 B1 | 2/2001 | Conner | |
| 6,360,876 B1 | 3/2002 | Nohl et al. | |
| 6,481,563 B1 * | 11/2002 | Gilmore | 198/511 |
| 6,571,938 B2 * | 6/2003 | Gilmore | 198/812 |
| 6,729,464 B2 | 5/2004 | Thomas et al. | |
| 6,929,113 B1 | 8/2005 | Hoover et al. | |
| 7,108,125 B2 | 9/2006 | Gilmore et al. | |

* cited by examiner

*Primary Examiner*—Mark A Deuble
(74) *Attorney, Agent, or Firm*—Chambliss, Bahner & Stophel, P.C.

(57) ABSTRACT

A portable telescoping stacking conveyor for stockpiling bulk particulate materials includes a primary conveyor frame, a secondary conveyor frame, an undercarriage and a base frame having a king pin for engagement with a tow vehicle. The front end of the primary conveyor frame is pivotally mounted to the base frame. The secondary conveyor frame of the portable telescoping stacking conveyor has a left secondary top chord and a right secondary top chord. The secondary conveyor frame is receivable by the primary conveyor frame and moveable with respect thereto between a retracted position and an extended position. The primary conveyor frame is arranged, configured and adapted to support the secondary conveyor frame only by supporting the left secondary top chord and the right secondary top chord.

20 Claims, 6 Drawing Sheets

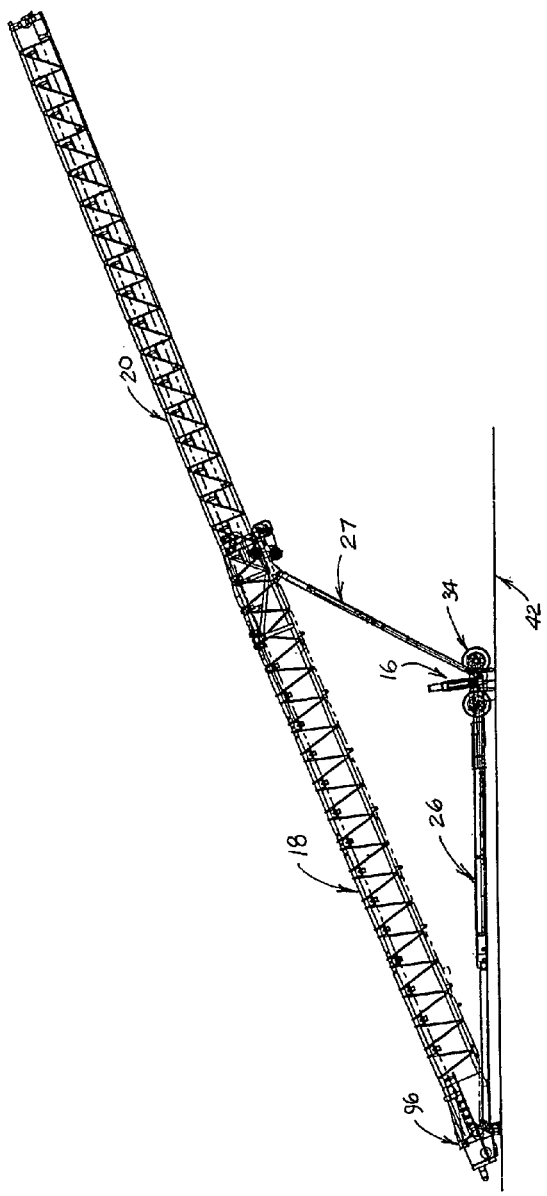
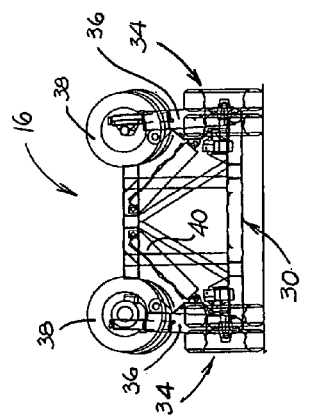
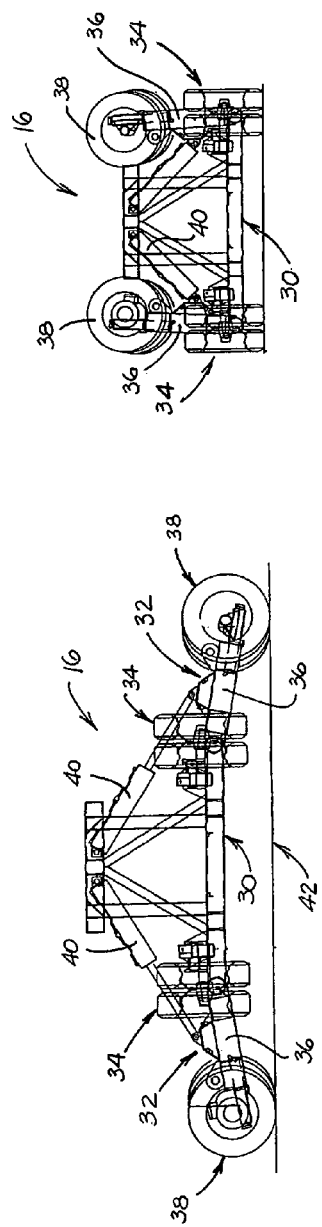

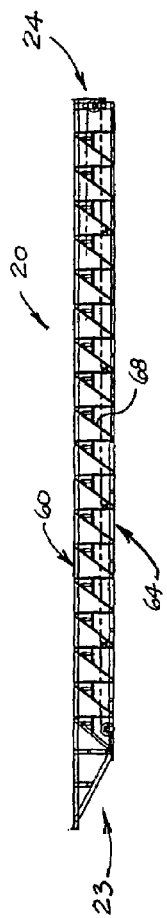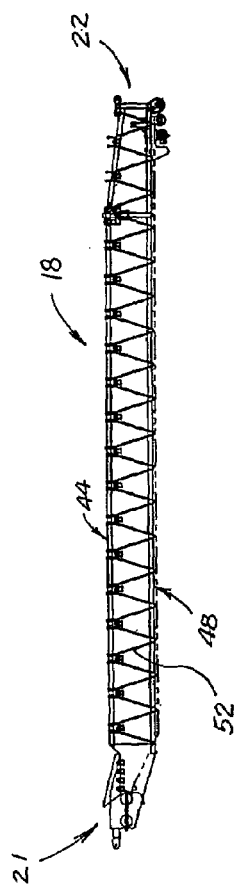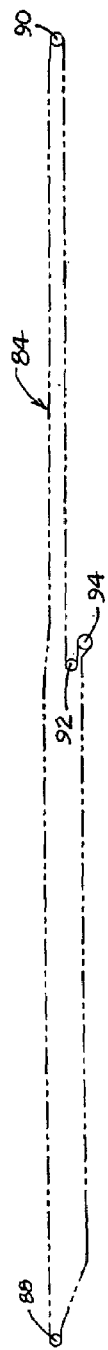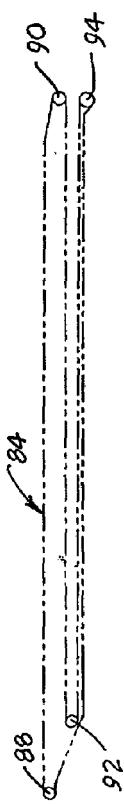
FIGURE 7
FIGURE 6
FIGURE 9
FIGURE 8

PORTABLE TELESCOPING STACKING CONVEYOR

FIELD OF THE INVENTION

This invention relates generally to a portable conveyor for moving bulk particulate materials such as crushed stone, sand, grain and coal. More particularly, the invention relates to a portable telescoping stacking conveyor which may be placed in a transport configuration and towed by a highway tractor or tow vehicle to a suitable work site, whereupon it may be detached from the tow vehicle and placed in an operating configuration.

Explanation of Technical Terms

The term "bulk particulate material" and similar terms refer to various materials including particulates such as sand, gravel, crushed stone, cement, concrete, asphalt, coal, dirt, pellets, granules, powders, hulls, wood chips, grains and other similar products.

The terms "above", "top", "upper" and similar terms, as used herein to indicate the position of a component of a portable telescoping stacking conveyor relative to another component or structure, refer to a position higher in elevation when the conveyor is in its normal operating or transport configurations.

The terms "below", "bottom", "lower" and similar terms, as used herein to indicate the position of a component of a portable telescoping stacking conveyor relative to another component or structure, refer to a position lower in elevation when the conveyor is in its normal operating or transport configurations.

As used herein, the terms "forward", "front" and similar terms, when used in connection with a portable telescoping conveyor, a component of such conveyor or a position on such a component, refer to the end of the conveyor or component nearest the tractor when the conveyor is in its transport configuration. The terms "backward", "rear" and similar terms, when used in connection with such a conveyor, component or position, refer to the end of the conveyor or component opposite the front end.

As used herein, the term "linear actuator" and similar terms refers to a mechanical, electric, hydraulic or electro-hydraulic device that generates force that is directed in a straight line. One common example of a linear actuator is a hydraulic cylinder which includes a cylinder, a piston within the cylinder, and a rod attached to the piston. By increasing the pressure within the cylinder on one side of the piston (over that on the opposite side of the piston), the rod will extend from the cylinder or retract into the cylinder. Other common examples of linear actuators are tension springs and compression springs.

BACKGROUND AND DESCRIPTION OF THE PRIOR ART

Conveyors of various types are well known for handling bulk particulate materials. Belted conveyors, in which an endless belt is transported around a plurality of troughing roller and idler roller assemblies, are frequently used for transporting abrasive materials. Screw conveyors and bucket conveyors can be used to transport freely flowing materials and can move such materials vertically. Linked and paddle type conveyors of various configurations can be used to move bulk particulate materials at steeper inclinations than are possible for belted conveyors.

Stockpiles of bulk particulate materials may be created using stacking conveyors which are designed to drop the materials off an elevated discharge end. The amount of material that can be placed in a stockpile by a stacking conveyor depends in part on the length of the conveyor and on the elevation of its discharge end. Furthermore, a stacking conveyor that is adapted to pivot about its feed end in a radial direction can stockpile a much greater quantity of bulk particulate materials than can one that is fixed against radial movement.

When bulk material handling needs at a particular site are temporary, it is desirable to use a portable stacking conveyor. In order for such a conveyor to be of sufficient length and elevation to be useful and short enough to be transportable over public roads, it must be capable of being configured between an extended operating configuration and a shortened transport configuration. U.S. Pat. No. 4,135,614 of Penterman and U.S. Pat. No. 5,515,961 of Murphy et al. describe portable radial stacking conveyors comprising a center section and a pair of folding end sections that fold over the center section for transport and unfold for operation. U.S. Pat. No. 6,186,311 of Conner describes a portable conveyor system comprising a pair of folding stacking conveyors and a pair of transport conveyors. The stacking conveyors are folded and disposed side by side for transport with the transport conveyors removably mounted atop the folded stacking conveyors. U.S. Pat. No. 6,056,252 of Johannsen and U.S. Pat. No. 6,360,876 of Nohl et al. describe portable stacking conveyors which include a primary conveyor that is adapted to receive a secondary conveyor in telescoping fashion and means for moving the secondary conveyor longitudinally with respect to the primary conveyor between a retracted position and an extended position. U.S. Pat. No. 6,929,113 of Hoover et al. describes a portable radial stacking conveyor having a primary conveyor frame and a telescoping secondary conveyor frame, both of which support a single conveyor belt having a single drive mechanism. U.S. Pat. No. 5,203,442 of Oury et al. describes a cantilever conveyor for concrete which includes a single belt supported by a primary frame, a secondary frame and a tertiary frame. The secondary frame is mounted so as to telescope from the primary frame, and the tertiary frame is mounted so as to telescope from the secondary frame.

It is desirable to have a portable stacking conveyor that can be placed in an operating configuration that is as long as possible but which can also be placed in a transport configuration that is short enough and light enough to be transportable over public roads. In a portable stacking conveyor comprising a primary conveyor (or primary conveyor frame) and a telescoping secondary conveyor (or secondary conveyor frame), the difference between its length in the operating configuration and its length in the travel configuration depends in part on the support mechanism by which the primary conveyor (or primary conveyor frame) supports the secondary conveyor (or secondary conveyor frame) when extended. In the assembly of U.S. Pat. No. 6,056,252, a dual support assembly is provided, in which the bottom chord of the secondary (or extensible) conveyor frame is supported by a first support assembly located at the rear end of the primary conveyor frame, while the top chord of the secondary conveyor frame is supported by a second support assembly spaced from the first support assembly towards the front end of the primary conveyor frame. In the assembly of U.S. Pat. No. 6,929,113, a first roller assembly located on the lower portion of the primary conveyor frame at the rear end supports the bottom chord of the secondary conveyor frame, and a second roller assembly located on the top chord of front end of the secondary conveyor frame bears against an upper beam of the primary conveyor frame.

ADVANTAGES OF A PREFERRED EMBODIMENT OF THE INVENTION

Among the advantages of a preferred embodiment of the invention is that it provides a telescoping conveyor assembly in which the secondary conveyor frame is supported only at its top chord by the primary conveyor frame. This allows for the retracted combination of a primary conveyor frame of conventional length and a secondary conveyor frame of conventional length to be shorter than conventional support assemblies (which support the secondary conveyor frame by its bottom chord) would allow. Another advantage of a preferred embodiment of the invention is that it provides a telescoping conveyor having a king pin which retracts into a king pin receiver when the conveyor is placed in its operating configuration. Still another advantage of a preferred embodiment of the invention is that it provides a telescoping conveyor having a hopper at its feed end, the top of which is lower than that of many conventional conveyors.

Additional objects and advantages of this invention will become apparent from an examination of the drawings and the ensuing description.

SUMMARY OF THE INVENTION

The invention comprises a portable telescoping stacking conveyor for stockpiling bulk particulate materials. This stacking conveyor includes a primary conveyor frame, a secondary conveyor frame, an undercarriage comprising an undercarriage frame with a plurality of transport wheels, and a base frame having a king pin for engagement with a tow vehicle. The primary conveyor frame of the portable telescoping stacking conveyor has a front end and a rear end, and the front end of the primary conveyor frame is pivotally mounted to the base frame. The secondary conveyor frame of the portable telescoping stacking conveyor has a front end and a rear end, a left secondary top chord and a right secondary top chord. The secondary conveyor frame is receivable by the primary conveyor frame and moveable with respect thereto between a retracted position and an extended position. The primary conveyor frame is arranged, configured and adapted to support the secondary conveyor frame only by supporting the left secondary top chord and the right secondary top chord. The telescoping stacking conveyor also includes a first roller disposed near the top of the front end of the primary conveyor frame, a second roller disposed near the top of the rear end of the secondary conveyor frame, a third roller disposed near the bottom of the front end of the secondary conveyor frame and a fourth roller disposed near the bottom of the rear end of the primary conveyor frame. An endless belt is supported by the first, second, third and fourth rollers when the secondary conveyor frame is in both the retracted and extended positions.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which:

FIG. 3 is a side view of a preferred embodiment of the invention showing it in the operating configuration with the secondary conveyor frame in the extended position and the rear end of the primary conveyor frame in an elevated position.

FIG. 4 is an enlarged side view of the undercarriage of a preferred embodiment of the invention showing the radial travel wheels in contact with the ground.

FIG. 5 is an enlarged side view of the undercarriage of a preferred embodiment of the invention showing the transport wheels in contact with the ground.

FIG. 6 is a side view of the primary conveyor frame of a preferred embodiment of the invention.

FIG. 7 is a side view of the secondary conveyor frame of a preferred embodiment of the invention.

FIG. 8 is a schematic illustration of the belt pattern of a preferred embodiment of the invention with the secondary conveyor frame in the retracted position.

FIG. 9 is a schematic illustration of the belt pattern of a preferred embodiment of the invention with the secondary conveyor frame in the extended position.

DESCRIPTION OF THE PREFERRED EMBODIMENTS OF THE INVENTION

Figure 1:
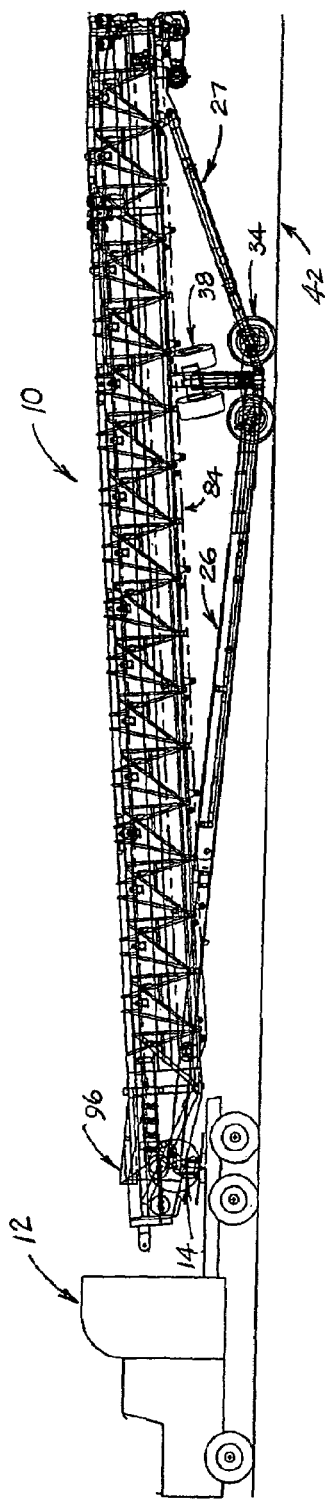
FIG. 1 is a side view of a preferred embodiment of the invention showing it mounted on a tow vehicle in the transport configuration.

Referring now to FIG. 1, a preferred embodiment of the invention comprises portable telescoping stacking conveyor 10, which is adapted to be towed by tractor 12. Conveyor 10 includes base frame 14, undercarriage 16 (best shown in FIGS. 4 and 5), primary conveyor frame 18 (best shown in FIGS. 3 and 6) and secondary conveyor frame 20 (best shown in FIGS. 3 and 7). The secondary conveyor frame is adapted to be received by the primary conveyor frame and is moveable with respect thereto between a retracted position and an extended position. Primary conveyor frame 18 has front end 21 and rear end 22 (best shown in FIG. 6), and secondary conveyor frame 20 has front end 23 and rear end 24 (best shown in FIG. 7). Preferably, a chain or other line, rope, wire rope or cable that connects the primary and secondary conveyor frames is driven by hydraulic motor 25 (shown in FIG. 11) in a conventional manner to move the secondary conveyor frame with respect to the primary conveyor frame.

Figure 2:
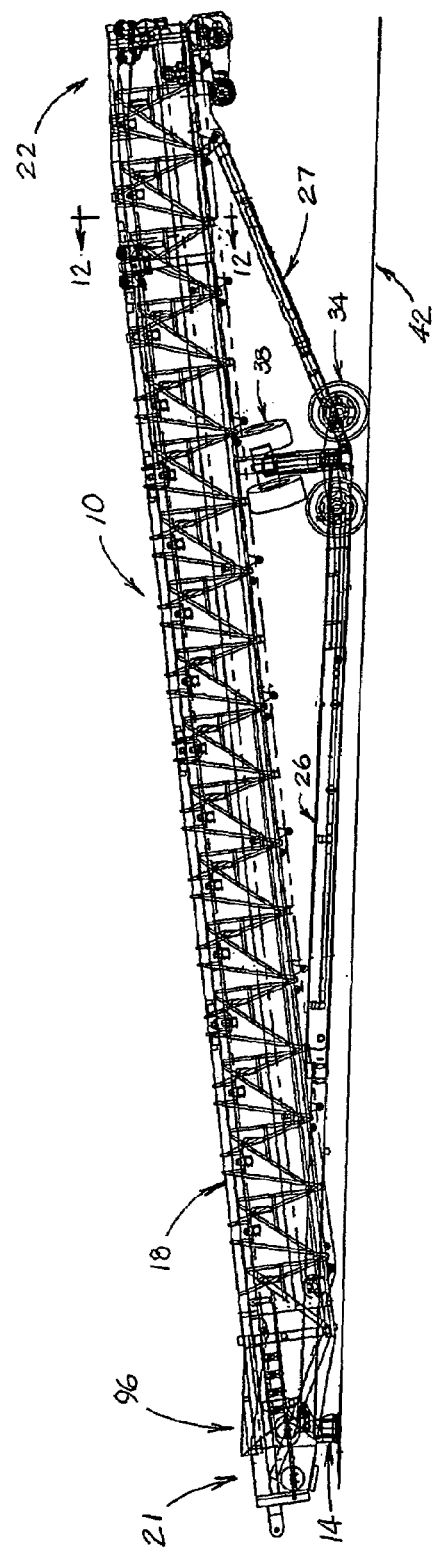
FIG. 2 is a side view of a preferred embodiment of the invention showing it dismounted from the tow vehicle in the set-up configuration with the primary conveyor frame lowered and the secondary conveyor frame in the retracted position.

FIG. 1 illustrates conveyor 10 in its transport configuration, in which the primary conveyor frame is lowered and the secondary conveyor frame is retracted within the primary conveyor frame. FIG. 2 illustrates conveyor 10 in its set-up configuration, in which the conveyor has been detached from the tractor; however, the primary conveyor frame remains in the lowered position and the secondary conveyor frame remains in its retracted position. FIG. 3 shows conveyor 10 in its operating configuration, in which the primary conveyor frame has been elevated and the secondary conveyor frame extended therefrom.

Figure 10:
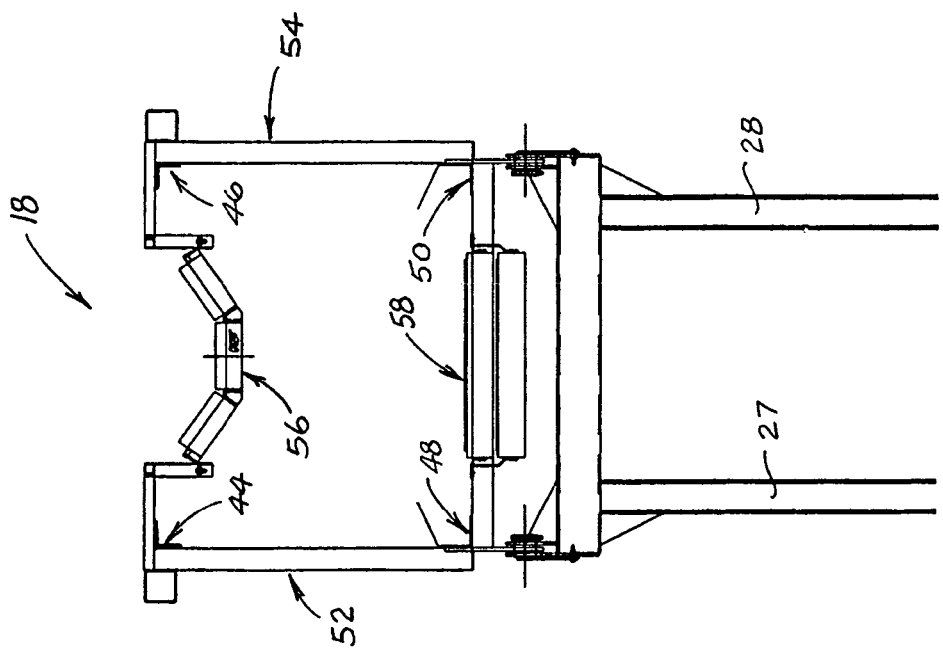
FIG. 10 is an end view of a portion of the primary conveyor frame and primary rear end strut components of a preferred embodiment of the invention.

As shown in FIGS. 1-3, preferred portable telescoping stacking conveyor 10 includes a primary front end support strut 26 connected between front end 21 of primary conveyor frame 18 and undercarriage 16. Although not shown in the drawings, the primary front end support strut may be comprised of a pair of parallel support components. In addition, an extensible primary rear end support strut, comprised of left rear strut component 27 and right rear strut component 28 (see FIG. 10), is connected between rear end 22 of the primary conveyor frame and the undercarriage. Preferably, one or more linear actuators are mounted within or adjacent to the rear strut components for extending the primary rear end support strut.

Referring now to FIGS. 4 and 5, preferred undercarriage 16 includes undercarriage frame 30 to which are attached radial travel wheel assemblies 32 and dual transport wheel sets 34. Each of radial travel wheel assemblies 32 includes a travel strut 36 that is pivotally mounted to undercarriage frame 30 and a dual tandem wheel set 38. Each radial travel wheel assembly also includes a linear actuator 40 which may be actuated to pivot the travel strut (to which wheel set 38 is attached) with respect to the undercarriage frame so that wheel set 38 is moved between a transport position, in which transport wheel sets 34 are in contact with surface 42 and radial travel wheels 38 are elevated above surface 42 (shown in FIGS. 1, 2 and 5) and an operating position, in which radial travel wheels 38 are in contact with surface 42 (shown in FIGS. 3 and 4). As linear actuators 40 are operated to pivot struts 36 so that travel wheels 38 come into contact with surface 42, undercarriage frame 30 will be elevated to lift wheel sets 34 off of surface 42 (as best shown in FIG. 4).

If the linear actuators associated with undercarriage 16 and rear end support struts 27 and 28 are hydraulic cylinders, a hydraulic fluid reservoir, hydraulic pump and appropriate hydraulic control systems (not shown) may be mounted on the undercarriage or in another convenient location to operate these systems.

Figure 11:
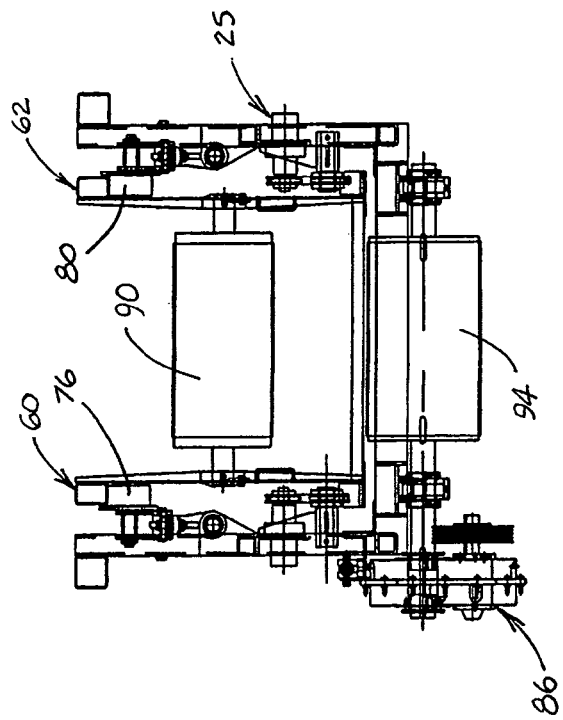
FIG. 11 is a rear end view of the primary conveyor frame and secondary conveyor frame of a preferred embodiment of the invention.
Figure 12:
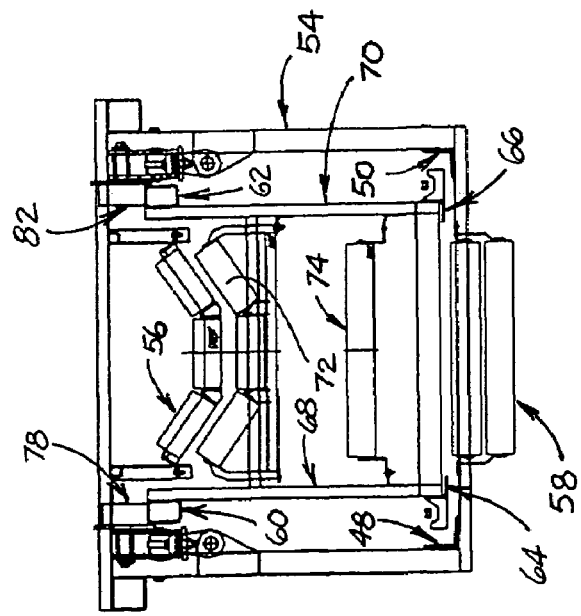
FIG. 12 is a sectional view of a portion of the primary conveyor frame and secondary conveyor frame of a preferred embodiment of the invention, taken through the line 12-12 of FIG. 2.

The basic structure of preferred primary conveyor frame 18 is a conventional lattice-type construction, as best shown in FIGS. 6 and 10-12. As shown therein, primary conveyor frame 18 includes left primary top chord 44 (best seen in FIG. 10), right primary top chord 46 (FIG. 10), left primary bottom chord 48 and right primary bottom chord 50. Preferably, these primary chords comprise 6"×6" angles. Left primary truss side 52 is located between top chord 44 and bottom chord 48, and right primary truss side 54 is located between top chord 46 and bottom chord 50. A plurality of primary troughing roller assemblies 56 and a plurality of primary idler roller assemblies 58 are mounted between the left and right primary truss sides. Secondary conveyor frame 20 is also preferably of lattice-type construction, as best shown in FIGS. 7, 11 and 12. As shown therein, secondary conveyor frame 20 includes left secondary top chord 60 and right secondary top chord 62, left secondary bottom chord 64 and right secondary bottom chord 66. Left secondary truss side 68 is located between top chord 60 and bottom chord 64, and right secondary truss side 70 is located between top chord 62 and bottom chord 66. It is preferred that left secondary top chord 60 and right secondary top chord 62 each comprise a rectangular load-bearing member, as best shown in FIGS. 11 and 12. It is also preferred that left and right secondary bottom chords comprise 4"×4" angles. A plurality of secondary troughing roller assemblies 72 and a plurality of secondary idler roller assemblies 74 are mounted between the left and right secondary truss sides. As shown in FIGS. 11 and 12, the primary conveyor frame is arranged, configured and adapted to support the secondary conveyor frame only by supporting the left secondary top chord and the right secondary top chord. More particularly, the secondary conveyor frame is supported by a left roller support assembly that is mounted on the primary conveyor frame and adapted to support the left secondary top chord, and a right roller support assembly that is mounted on the primary conveyor frame and adapted to support the right secondary top chord. Preferably, the left roller support assembly comprises first left roller support 76 and second left roller support 78 and the right roller support assembly comprises first right roller support 80 and second right roller support 82. As shown in FIG. 11, preferred first left roller support 76 and preferred first right roller support 80 are mounted at or near the end of the primary conveyor frame and are adapted to engage the lower side of left and right secondary top chords 60 and 62, respectively. Furthermore, as shown in FIG. 12, preferred second left roller support 78 is mounted on the primary conveyor frame between first left roller support 76 and front end 21 of the primary conveyor frame, and second right roller support 82 is mounted opposite the second left roller support on the primary conveyor frame between first right roller support 80 and front end 21 of the primary conveyor frame. These second left and right roller supports are adapted to engage the upper side of left and right secondary top chords 60 and 62, respectively.

Preferred radial telescoping stacking conveyor 10 includes endless belt 84 and a conventional belt drive assembly 86 (see FIG. 11) that is adapted to drive the endless belt. The belt drive assembly includes first roller 88, second roller 90, third roller 92 and fourth roller 94. As shown in FIGS. 8 and 9, first roller 88 is disposed near the top of front end 21 of the primary conveyor frame, and second roller 90 is disposed near the top of rear end 24 of the secondary conveyor frame. Third roller 92 is disposed near the bottom of front end 23 of the secondary conveyor frame, and fourth roller 94 is disposed near the bottom of rear end 22 of the primary conveyor frame. As the secondary conveyor frame is moved between the retracted position illustrated in FIGS. 2 and 8 and the extended position illustrated in FIGS. 3 and 9, endless belt 84 is supported by the first, second, third and fourth rollers (as shown in FIGS. 8 and 9). Of course, belt 84 is also disposed around the plurality of intermediate troughing roller assemblies and idler roller assemblies, as is known to those having ordinary skill in the art to which the invention relates.

Figure 13:
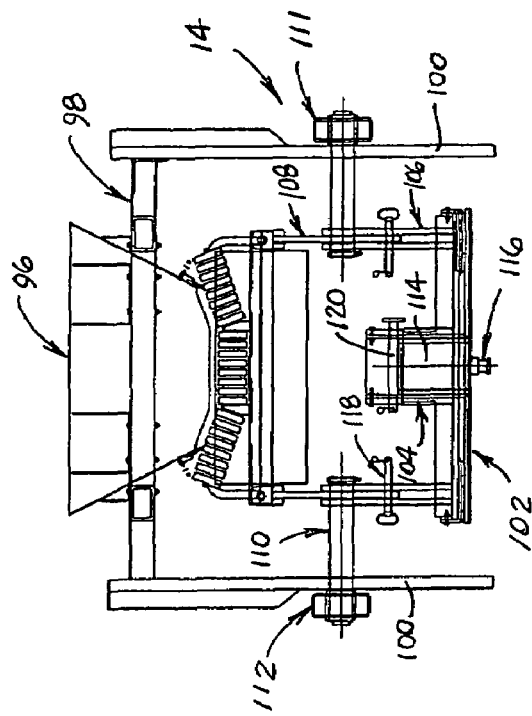
FIG. 13 is a front end view of a portion of the primary conveyor frame and the base frame of a preferred embodiment of the invention.

As best shown in FIG. 13, preferred telescoping stacking conveyor 10 includes hopper 96 adjacent to front end 21 of primary conveyor frame 18 (see also FIGS. 1-3). The hopper is mounted on portion 98 of primary conveyor frame 18 which includes a pair of support legs 100. Because the secondary conveyor frame is not supported from the primary conveyor frame by its bottom chords, front end 21 of the primary conveyor frame may be tapered on its lower side so as to reduce the distance between base frame 14 and the top of the hopper.

Figure 15:
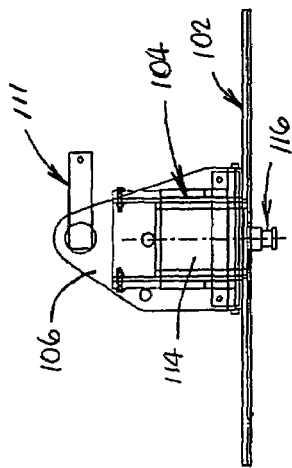
FIG. 15 is a side view of the portion of the base frame shown in FIG. 14, with one of the primary conveyor supports removed for clarity.
Figure 17:
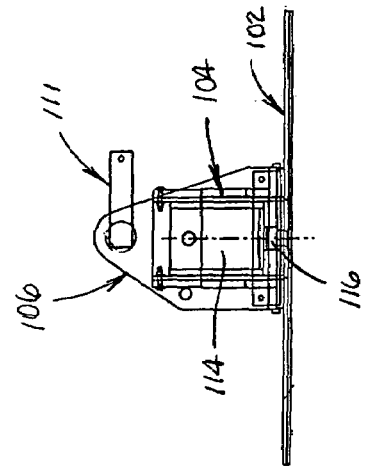
FIG. 17 is a side view of the portion of the base frame shown in FIG. 16, with one of the primary conveyor supports removed for clarity.
Figure 14:
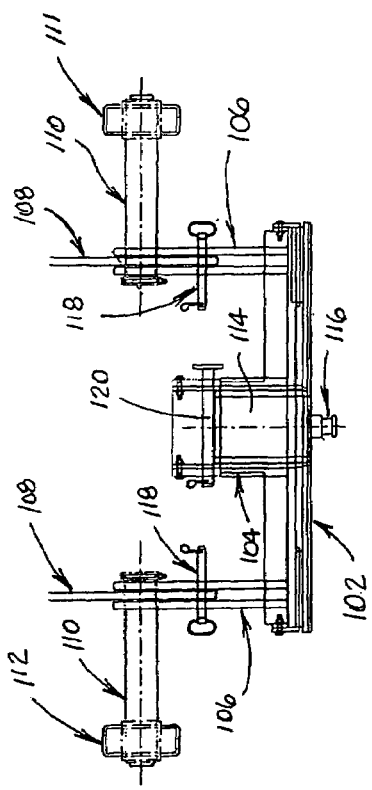
FIG. 14 is a front end view of a portion of the primary conveyor frame and the base frame of a preferred embodiment of the invention, showing the primary conveyor frame locked to the base frame and the king pin extended.
Figure 16:
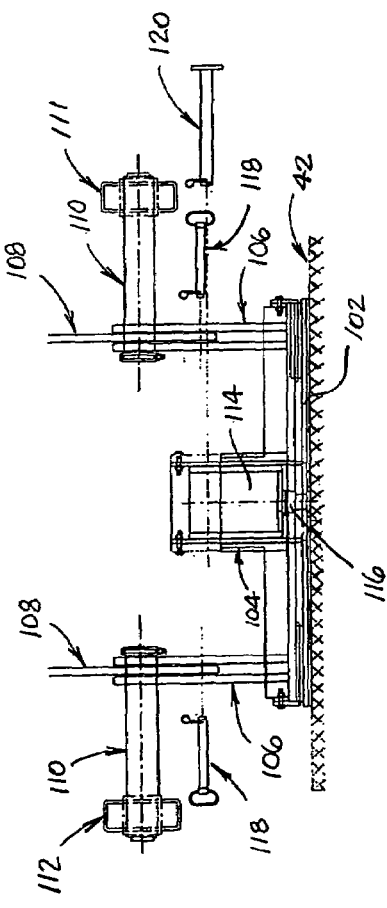
FIG. 16 is a front end view of a portion of the primary conveyor frame and the base frame of a preferred embodiment of the invention, showing the primary conveyor frame unlocked for rotation with respect to the base frame and the king pin retracted.

Referring now to FIGS. 13-17, the preferred base frame will be described in more detail. As shown therein, base frame 14 includes bottom plate 102 having a hole therethrough, and a king pin receiver 104 that is mounted on the bottom plate. A pair of primary conveyor supports 106 are mounted on the bottom plate on opposite sides of the king pin receiver. A pair of primary conveyor legs 108 are attached to front end 21 of primary conveyor frame 18, and these primary conveyor legs are pivotally mounted to primary conveyor supports 106 by pivot pins 110, each of which also extends through one of the hopper support legs 100 (see FIG. 13) and links 111 and 112 of the parallel support components of front end support strut 26. As shown in FIGS. 13, 14 and 16, primary conveyor supports 106 are located on opposite sides of king pin receiver 104. A king pin assembly is provided, which comprises king pin support 114 and king pin 116 that extends from the king pin support. King pin support 114 is received in and in sliding engagement with king pin receiver 104 so as to move between a raised position in which king pin 116 is above bottom plate 102 because the king pin is in contact with surface 42 (as shown in FIGS. 16 and 17), and a lowered position in which the king pin extends through the hole in the bottom plate (as shown in FIGS. 13-15) under the influence of gravity. King pin 116 is adapted for engagement with tow vehicle 12.

When conveyor 10 is in its transport configuration with king pin 116 attached to tow vehicle 12, primary conveyor frame 18 is preferably locked against pivotal motion. This is accomplished by inserting conveyor locking pins 118 through appropriately located holes in primary conveyor supports 106 and primary conveyor legs 108, as shown in FIGS. 13-15. At the same time, king pin locking pin 120 is inserted through appropriately located holes in king pin receiver 104 to prevent the king pin assembly from moving upwardly and thereby dislodging the king pin from engagement with the tow vehicle. When it is desired to reconfigure conveyor 10 from the transport configuration to the operating configuration, king pin locking pin 120 is removed to allow king pin support 114 to move up within king pin receiver 104 as king pin 116 comes into contact with surface 42, thereby protecting the king pin from abuse (as shown in FIGS. 16-17). In addition, conveyor locking pins 118 may be removed to allow the primary conveyor to pivot with respect to the base frame.

The preferred embodiment of the invention that is described herein provides a telescoping conveyor assembly in which the secondary conveyor frame is supported only at its top chord by the primary conveyor frame. This allows for the retracted combination of a primary conveyor frame of conventional length and a secondary conveyor frame of conventional length to be shorter than conventional support assemblies would allow. This also permits the tapering of the primary conveyor frame at its front end so that the height of the top of the hopper may be lowered. Finally, the preferred embodiment of the invention includes a king pin which retracts into a king pin receiver when the conveyor is placed in its operating configuration.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

The invention claimed is:

1. A portable telescoping stacking conveyor for stockpiling bulk particulate materials comprising:
    (a) an undercarriage comprising a plurality of transport wheels, a plurality of radial travel wheels, and means for selectively bringing the transport wheels and the radial travel wheels into contact with the ground;
    (b) a primary conveyor frame having a front end and a rear end;
    (c) a secondary conveyor frame that is receivable by the primary conveyor frame and moveable with respect thereto between a retracted position and an extended position, said secondary conveyor frame having a front end, a rear end, a left secondary top chord and a right secondary top chord;
    (d) a secondary conveyor frame support assembly that is mounted on the primary conveyor frame and adapted to bear against the left secondary top chord and the right secondary top chord;
    (e) a base frame having a king pin for engagement with a tow vehicle;
    (f) means for moving the secondary conveyor frame with respect to the primary conveyor frame between the retracted and the extended positions;
    (g) a first roller disposed near the top of the front end of the primary conveyor frame;
    (h) a second roller disposed near the top of the rear end of the secondary conveyor frame;
    (i) a third roller disposed near the bottom of the front end of the secondary conveyor frame;
    (j) a fourth roller disposed near the bottom of the rear end of the primary conveyor frame;
    (k) an endless belt that is supported by the first, second, third and fourth rollers when the secondary conveyor frame is in both the retracted and extended positions;
    (l) a belt drive assembly that is adapted to drive the endless belt;

wherein the primary conveyor frame is arranged, configured and adapted to support the secondary conveyor frame only by supporting the left secondary top chord and the right secondary top chord.

2. The portable telescoping stacking conveyor of claim 1 wherein the base frame comprises:
    (a) a bottom plate having a hole therethrough;
    (b) a king pin receiver that is mounted on the bottom plate;
    (c) a pair of primary conveyor supports to which the front end of the primary conveyor frame is pivotally mounted, said primary conveyor supports being located on opposite sides of the king pin receiver;

(d) a king pin assembly having a king pin support and a king pin that extends therefrom, said king pin support being received in and in sliding engagement with the king pin receiver so as to move between a raised position in which the king pin is above the bottom plate and a lowered position in which the king pin extends through the hole in the bottom plate, said king pin being adapted for engagement with a tow vehicle.

3. The portable telescoping stacking conveyor of claim 1 which includes a hopper adjacent to the front end of the primary conveyor frame.

4. The portable telescoping stacking conveyor of claim 3 wherein the front end of the primary conveyor frame is tapered so as to reduce the distance between the top of the bottom plate of the base frame and the top of the hopper.

5. The portable telescoping stacking conveyor of claim 1:
  (a) wherein the secondary conveyor frame comprises:
    (i) a left secondary top chord comprising a rectangular load-bearing member, said left secondary top chord having an upper side and a lower side;
    (ii) a right secondary top chord comprising a rectangular load-bearing member, said right secondary top chord having an upper side and a lower side;
  (b) which includes:
    (i) a left roller support assembly which is mounted on the primary conveyor frame and is adapted to support the left secondary top chord of the secondary conveyor frame;
    (ii) a right roller support assembly which is mounted on the primary conveyor frame and is adapted to support the right secondary top chord of the secondary conveyor frame.

6. The portable telescoping stacking conveyor of claim 5 wherein:
  (a) the left roller support assembly includes a first left roller support which is mounted near the rear end of the primary conveyor frame and is adapted to engage with the lower side of the left secondary top chord;
  (b) the right roller support assembly includes a first right roller support which is mounted near the rear end of the primary conveyor frame and is adapted to engage with the lower side of the right secondary top chord of the secondary conveyor frame.

7. The portable telescoping stacking conveyor of claim 5 wherein:
  (a) the left roller support assembly includes a second left roller support which is mounted on the primary conveyor frame between the first left roller support and the front end of the primary conveyor frame and is adapted to engage with the upper side of the left secondary top chord of the secondary conveyor frame;
  (b) the right roller support assembly includes a second right roller support which is mounted on the primary conveyor frame between the first right roller support and the front end of the primary conveyor frame and is adapted to engage with the upper side of the right secondary top chord of the secondary conveyor frame.

8. A portable telescoping stacking conveyor for stockpiling bulk particulate materials comprising:
  (a) an undercarriage comprising an undercarriage frame and a plurality of transport wheels attached thereto;
  (b) a base frame having a king pin for engagement with a tow vehicle;
  (c) a primary conveyor frame having a front end and a rear end, said front end of the primary conveyor frame being pivotally mounted to the base frame;
  (d) a secondary conveyor frame having a front end and a rear end, said secondary conveyor frame being receivable by the primary conveyor frame and moveable with respect thereto between a retracted position and an extended position, said secondary conveyor frame further comprising a left secondary top chord and a right secondary top chord;
  (e) means for moving the secondary conveyor frame between the retracted and the extended positions;
  (f) a first roller disposed near the top of the front end of the primary conveyor frame;
  (g) a second roller disposed near the top of the rear end of the secondary conveyor frame;
  (h) a third roller disposed near the bottom of the front end of the secondary conveyor frame;
  (i) a fourth roller disposed near the bottom of the rear end of the primary conveyor frame;
  (j) an endless belt that is supported by the first, second, third and fourth rollers when the secondary conveyor frame is in both the retracted and extended positions;
  (k) a belt drive assembly that is adapted to drive the endless belt;
  wherein the primary conveyor frame is arranged, configured and adapted to support the secondary conveyor frame only by supporting the left secondary top chord and the right secondary top chord.

9. The portable telescoping stacking conveyor of claim 8 wherein the base frame comprises:
  (a) a bottom plate having a hole therethrough;
  (b) a king pin receiver that is mounted on the bottom plate;
  (c) a pair of primary conveyor supports to which the feed end of the primary conveyor frame is pivotally mounted, said primary conveyor supports being located on opposite sides of the king pin receiver;
  (d) a king pin assembly having a king pin support and a king pin that extends therefrom, said king pin support being received in and in sliding engagement with the king pin receiver so as to move between a raised position in which the king pin is above the bottom plate and a lowered position in which the king pin extends through the hole in the bottom plate.

10. The portable telescoping stacking conveyor of claim 8 wherein each transport wheel attached to the undercarriage frame comprises dual tandem wheels.

11. The portable telescoping stacking conveyor of claim 8 which includes a hopper adjacent to the front end of the primary conveyor frame.

12. The portable telescoping stacking conveyor of claim 11 wherein the front end of the primary conveyor frame is tapered so as to reduce the distance between the top of the base frame and the top of the hopper.

13. The portable telescoping stacking conveyor of claim 8 wherein:
  (a) the left secondary top chord of the secondary conveyor frame comprises a rectangular load-bearing member extending outwardly from the top portion of the left secondary truss side, said left secondary top chord having an upper side and a lower side;
  (b) the right secondary top chord of the secondary conveyor frame comprises a rectangular load-bearing member extending outwardly from the top portion of the right secondary truss side, said right secondary top chord having an upper side and a lower side.

14. The portable telescoping stacking conveyor of claim 13 which includes:
   (a) a left roller support assembly which is mounted on the primary conveyor frame and is adapted to support the left secondary top chord of the secondary conveyor frame;
   (b) a right roller support assembly which is mounted on the primary conveyor frame and is adapted to support the right secondary top chord of the secondary conveyor frame.

15. The portable telescoping stacking conveyor of claim 14 wherein:
   (a) the left roller support assembly includes:
      (i) a first left roller support which is mounted near the rear end of the primary conveyor frame and is adapted to engage with the lower side of the left secondary top chord of the secondary conveyor frame;
      (ii) a second left roller support which is mounted on the primary conveyor frame between the first left roller support and the front end of the primary conveyor frame and is adapted to engage with the upper side of the left secondary top chord of the secondary conveyor frame;
   (b) the right roller support assembly includes:
      (i) a first right roller support which is mounted near the rear end of the primary conveyor frame and is adapted to engage with the lower side of the right secondary top chord of the secondary conveyor frame;
      (ii) a second right roller support which is mounted on the primary conveyor frame between the first right roller support and the front end of the primary conveyor frame and is adapted to engage with the upper side of the right secondary top chord of the secondary conveyor frame.

16. The portable telescoping stacking conveyor of claim 8 wherein the undercarriage comprises:
   (a) an undercarriage frame;
   (b) a pair of transport wheels that are mounted to the undercarriage frame;
   (c) a pair of radial travel wheel assemblies, each of which includes:
      (i) a travel strut that is pivotally mounted to the undercarriage frame;
      (ii) a radial travel wheel;
      (iii) means for pivoting the travel strut with respect to the undercarriage frame so as to move the radial travel wheel between a transport position and an operating position.

17. The portable telescoping stacking conveyor of claim 16 wherein each radial travel wheel assembly includes dual tandem wheels.

18. The portable telescoping stacking conveyor of claim 16 wherein the means for pivoting the travel strut with respect to the undercarriage frame comprises a linear actuator.

19. The portable telescoping stacking conveyor of claim 8 which includes:
   (a) a primary front end support strut connected between the front end of the primary conveyor frame and the undercarriage;
   (b) an extensible primary rear end support strut connected between the rear end of the primary conveyor frame and the undercarriage.

20. The portable telescoping stacking conveyor of claim 19 which includes a linear actuator for extending the primary rear end support strut.

* * * * *